Figure 1:
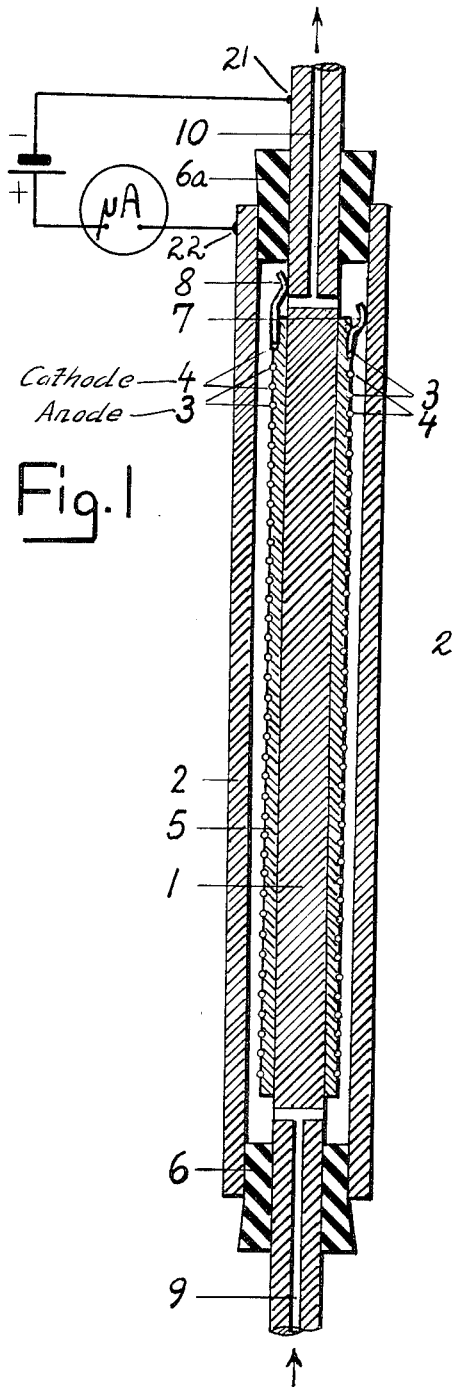

Dec. 14, 1965   P. A. HERSCH   3,223,608
ELECTROCHEMICAL GAS ANALYZER
Filed May 5, 1961

INVENTOR
Paul A. Hersch.

United States Patent Office 3,223,608
Patented Dec. 14, 1965

3,223,608
ELECTROCHEMICAL GAS ANALYZER
Paul A. Hersch, Fullerton, Calif.
(1640 Arundel St., St. Paul, Minn.)
Filed May 5, 1961, Ser. No. 108,198
2 Claims. (Cl. 204—195)

The present invention relates to the detection and measurement of oxygen and has particular reference to an improved apparatus analyzing trace contents of oxygen in other gases.

The literature on electroanalytical methods such as amperometry, voltammetry, or polarography contains innumerable methods and means for analyzing gases wherein an electric current generated by an external electromotive force compels the gas to be analyzed to participate in an electrode reaction. Naturally these techniques have often been applied to the determination of oxygen. However, in nearly all cases no more than a small fraction of the oxygen available is utilized. To be sensitive, the prior art methods require amplification of current. This requires costly accessories, especially as the current is direct.

The present invention makes amplification unnecessary at concentrations of oxygen as low even as one thousandths of one percent. Amplification is built into the electrochemistry rather than into the circuitry of the device, and this is achieved with very simple means.

Galvanic cells in various forms have proved highly sensitive and reliable for measuring oxygen, but unavoidably the anode material is consumable and requires, after a period, rejunvenation or replacement and the gas sample is of necessity depleted of at least some of its oxygen. These limitations can be readily overcome in the present amperometric method.

An object of this invention is, then, to provide a trace analyzer for oxygen which has a substantially unlimited life and no need for reconditioning and in which the sample need not suffer any change, and additionally which is exceedingly simple in construction and operation, and yet is sensitive to oxygen in million-fold dilution.

It is a further object of this invention to provide an amperometric analyzer lending itself to easy miniaturization or to use without the need of direct current amplification even where the gas contains as little as 0.001% $O_2$.

Other objects will appear as the description proceeds.

To the accomplishment of the foregoing and related ends, the invention then comprises the features hereinafter fully described and particularly pointed out in the claims, the following description setting forth in detail certain illustrative embodiments of the invention, these being indicative, however, of but a few of the many ways in which the principle of the invention may be employed.

Broadly stated, the present invention comprises an apparatus capable of detecting and measuring small amounts of oxygen in gases comprising a conductive cathode selected from the group consisting of carbon, copper, gold, silver, elements of Group VIII of the Periodic Table having an atomic number of at least 44 and mercury, a conductive anode selected from the group consisting of carbon, gold, silver, stainless steel, tantalum, mercury and elements of Group VIII of the Periodic Table having an atomic number of at least 44, a non-conductive porous diaphragm disposed between and in intimate contact with said electrodes wherein said cathode is partially exposed to the gas, said diaphragm being filled with an aqueous electrolyte wherein said electrolyte is quiescent, an outer source of electrical current having an electromotive force sufficient to cathodically reduce oxygen but insufficient to decompose water whereby hydrogen is evolved, and a current measuring device connected in series with said source of electrical current and said electrodes.

The applied potential must not be confused with a biasing potential sometimes intended to improve the performance of galvanic sensors. The present amperometric device is not "improved" by the electromotive force. It would not work at all without it. In galvanic cells, the overall process is spontaneous, with a loss of free enthalpy. They incorporate, of necessity, a consumable fuel, such as a base metal. In the present method, the overall process is controllably sustained from an independent external source and the present anode is not a base metal, but rather it can be a noble metal, or it can be inert like carbon, or it can be passive like stainless steel.

The applied potential, as noted in the above broadly stated paragraph, is sufficient to cathodically reduce oxygen but insufficient to decompose water whereby hydrogen is evolved. Those skilled in the art recognize this impressed electromotive force to be from about 0.5 to about 2 volts. In the preferred embodiment of my invention I use an applied electromotive force of from about 1.1 to about 1.8 volts.

The cathode may be of non-porous metal in the form of sheet, wire helices, screen, expanded metal or similar reticulated structures, with one part in free contact with the gas sample, the rest bathed by stagnant, at least unagitated electrolyte, preferably immobilized within the pores of a diaphragm. A most advantageous alternative, which greatly facilitates the complete electro-absorption of oxygen, is a porous sheet cathode facing the diaphragm on one side, the gas sample on the other, great care being taken that the total volume of electrolyte employed, while sufficient to wet the diaphragm and wet the anode, is not sufficient to occupy all the core space of the cathode; or, in other words, the total volume of electrolyte is less than the combined pore volume of the electrode assembly, the cathode, diaphragm and anode if the anode used is also porous. This not only ensures a microgeometry within the cathode pores which is stable, but also conditions under which the advantages of the porous structure as a gas electrode are fully utilized. A porous body partly reaching into a pool of electrolyte is not envisaged. Unless the sample gas is continuously pressed through such bodies—a laborious expedient—such porous bodies are inefficient. The anode may be made to contact the other face of the diaphragm, resulting in a sandwich structure. This need not be a flat but may take the form of three coaxial cylinders in close contact with each other.

The gas sample is made to flow over the cathode. At sufficiently low flow rates all the oxygen offered to the cathode is reduced to hydroxyl ion, in which case the electric current measured, less the residual current obtaining when no oxygen is present, is proportional to the rate of supply of oxygen to the cell and for a given concentration, to the flow rate, or, conversely, for a given constant flow rate, to the concentration. The current is, then, independent of temperature fluctuations and independent event of the area, nature and age of the cathode. At higher flow rates only a proportion of the oxygen is reduced, this proportion requiring to be calibrated with synthetic samples. At sufficiently high flow rates (the minimum depending on dimensions and materials) the current for a given concentration of oxygen becomes independent of the flow rate. The cells thus offer two sets of advantageous conditions, the choice to depend on the size of the sample and on whether one prefers to calibrate occasionally, or rather preserve a constant flow rate continually.

For the current measurement in the present cell an inexpensive microammeter serves the purpose. In galvanic systems the use of a cheap, high resistance microammeter is not recommended because it renders the response sluggish. Amperometric operation is advantageous in this respect. Instead of a microammeter it is possible to insert a fixed resistor and to record the potential drop with a millivolt recorder. Since relatively high resistances, such as 1000 ohms, are no objection in amperometric cells, the potential drop for a given current can be made relatively large so that the recorder need not have a high sensitivity. Assuming, conservatively, a 40% coulombic yield, using a resistor of 500 ohms, and passing 100 cu. cm. gas per minute with an oxygen content of one part per million, the output is 5.4 millivolts which can readily be recorded by conventional means and without electronic amplification.

To give a specific example, the cathode and anode may both be of silver. A bifilar winding of 0.02″ diameter silver wire is placed around a rod over a layer of porous polyvinylchloride. This assembly is submerged in a bath of 0.2 N KOH under a vacuum, which extracts the air from the pores of the polymer. Thus impregnated, the assembly is withdrawn, excess solution is allowed to drip off, and the rod mounted axially in a tubular housing with a sample gas inlet and outlet. The two silver wires have leads to the outside and a potential of 1.5 volts from a flashlight battery is applied to them. A microammeter is also inserted in the circuit. In the absence of oxygen, the potential is not sufficient to generate more than a small, smooth, residual current, mainly due to transfer of silver from the anode to the cathode. In the presence of oxygen the current rises in proportion to the concentration of oxygen, the range of linearity depending on the dimentions of the cell and the rate of gas flow. The apparatus combines high sensitivity with extreme simplicity. The cathodic and anodic reactions are, respectively, the reduction of oxygen and the formation of silver oxide. The latter is sufficiently conductive for continued operation of the cell. However, eventually the life of the cell may come to an end through metallic bridging between the windings. In this amperometric cell, the oxygen does not return to the sample, as it does in the following version. The cell should from time to time be calibrated by any of the well-established procedures.

Figure 2:
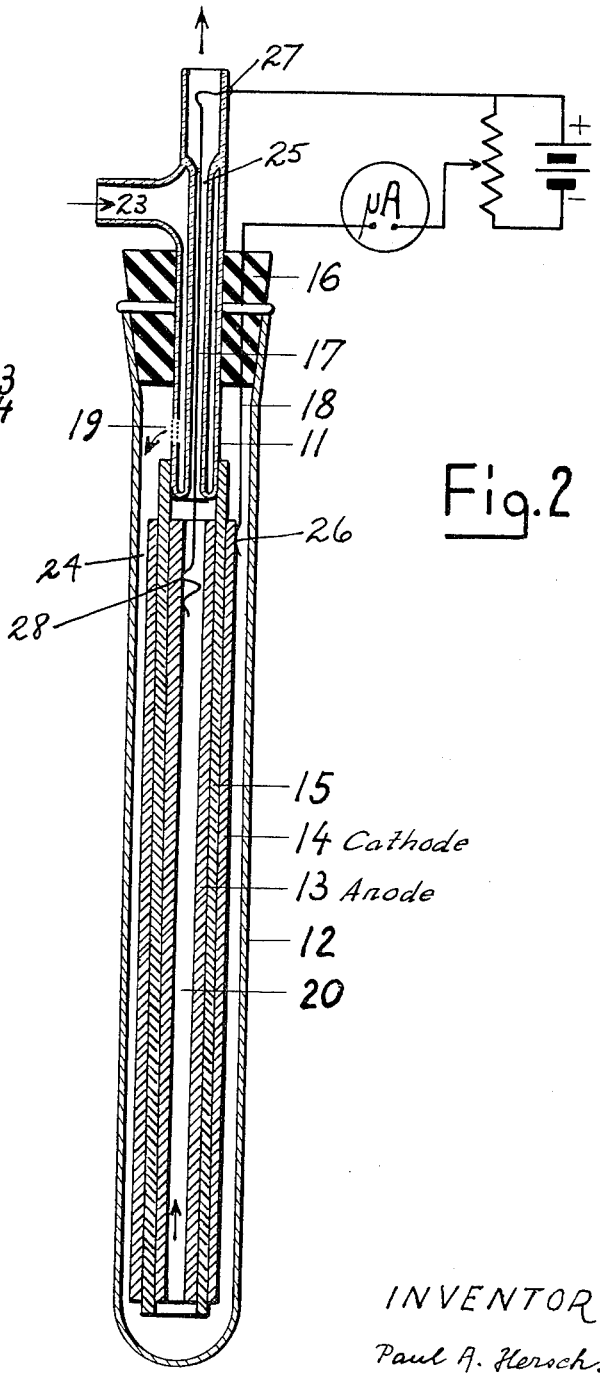

In the annexed drawings FIGS. 1 and 2 are diagrammatic representations of two embodiments of the present invention.

Referring more specifically to FIG. 1, steel rod 1 carries the polymeric, porous, electrolyte-impregnated, tubular diaphragm 5. Around diaphragm 5 is wound a silver wire anode helix 3 and a silver wire cathode helix 4. Rod 1 is inserted into stoppers 6 and 6a which close the openings in the ends of housing 2, which, for example, could be a steel tube. The sample gas enters and leaves through T-shaped channels 9 and 10 in rod 1. Helix 3 makes contact with housing 2 as at 7, and helix 4 makes contact with rod 1 as at 8. The external connections to the battery and meter are indicated at 21 and 22. Nylon threads (not shown) are used to hold helices 3 and 4 in place.

As a second example, a system comprising a porous silver cathode/diaphragm/platinum screen anode may be cited. The diaphragm is made of stiff, porous vinyl chloride in the form of a tube. The outside of the tube is lined by a sheet of porous silver (2 mm. thick, 50% porosity, 50-micron average pore diameter) bent to cylindrical shape. The inside of the polymer tube is clad with platinum weave (60 mesh/inch). This assembly is impregnated by a dip into 5 N KOH solution, the air from the pores again being removed by evacuation.

After this impregnation, about two-thirds of the solution contained in the pores of the silver is removed by repeated application of filter paper to the outside of the assembly. This is then positioned axially in a tubular housing, with conducting leads to the silver and platinum electrodes. An electromotive force of 1.75 volts is applied. The gas is conducted first through the annular space between the silver cathode and the housing, to return through the axial channel along the platinum anode. The cathodic reaction in this cell is, as before, the electrodissolution of oxygen, while the anodic reaction is its reverse, i.e., the evolution of oxygen. There are, therefore, no overall material changes, neither in the cell, nor in the gas sample. The oxygen is "borrowed" from the sample in the outer cathode space, and returned to it in the inner anode space. The cell can operate coulometrically below a limiting flow rate which depends on the dimensioning chosen. If the flow takes place in the reverse direction, the secondary oxygen evolved from the platinum adds to the primary oxygen from the sample. In this case the output can, in principle, rise to exceed the theoretical value as calculated from Faraday's law. Normally, at high flow rates the output for a given concentration reaches a saturation level when it is no longer dependent on the flow rate.

Referring now to FIG. 2 herein is illustrated a further embodiment of the present invention. On the inside, lining the tubular diaphragm 15, is tubular platinum screen anode 13 and coating the outside of diaphragm 15 is a porous tubular silver cathode 14. One end of doublewalled glass tube 11 fits tightly into the upper end of diaphragm 15 and the other end of glass tube 11 is inserted through stopper 16. The sample gas enters through opening 23 and travels between the double walls of glass tube 11, and leaves through opening 19 where it reaches the annular space 24 between housing 12 and cathode 14. The gas flows downwardly along cathode 14 and upwardly through central channel 20 and along anode 13, leaving through channel 25 of glass tube 11. A stainless steel wire 18 is inserted through stopper 16 and contacts cathode 14 as at 26. Platinum wire 17 fused through the upper end of glass tube as at 27, depends downwardly through channel 25 into channel 20 and contacts anode 13 as at 28.

It is of interest to note that if the present anode is made from platinum, tantalum, iridium, gold or stainless steel, the anode has a substantially indefinite life. With such an anode oxygen is evolved which is exactly equal to the oxygen content of the sample and the oxygen evolved is returned to the sample and thus the sample remains unchanged; however, of even more importance the cell remains unchanged and thus has a substantially indefinite life.

As stated previously, the anode can also be of silver or amalgamated inert metal. Silver and mercury are resistant to the electrolyte when the cell is uncircuited. When the cell is circuited a chemical change takes place, caused by the silver and mercury becoming oxidized during operation and the anode is thus gradually consumed. However, even though the anode is eventually consumed, the silver and amalgams make anodes which are rugged, robust and cheap enough to make them commercially desirable.

In addition to silver, the gas exposed cathode, as previously stated, may also be made of carbon, copper, gold, platinum and other metals of Group VIII of the Periodic Table having an atomic number of at least 44, or alloys of these metals. The cathode may carry a deposit of any one or of several of these metals, or of mercury, or it may be amalgamated; it may consist of carbon coated with one of the metals, or it may be a non-conducting support with a metallic film on its surface.

Silver and platinum have been cited as suitable anode materials. Others are gold, stainless steel, tantalum, mercury, carbon and the metals of Group VIII as defined above. The anode may be non-porous or porous, and may incorporate activators facilitating the evolution of oxygen. The surface of the anode may carry mercury or an amalgam which converts to mercuric oxide or other mercury compounds during operation.

Instead of caustic potash solution, the electrolyte may be sodium hydroxide or lithium hydroxide. Cells with non-alkaline electrolytes such as disodium hydrogen phosphate, potassium dihydrogen phosphate, potassium bicarbonate, or sulfuric acid, can also be used. In any event, the aqueous electrolyte is contained in the porous diaphragm where it is in a quiescent or stagnant state.

The invention is primarily applicable to the analysis of trace oxygen in gases. However, dilution methods can extend the range up to 100% oxygen. Dissolved oxygen may be measured after being transferred to a carrier gas. Oxygen left over after reaction with combustible materials can provide an indirect analysis of these. The amperometric cells of this invention can monitor industrial processes, operate alarm signals, and permit a continuous follow-up of physical, chemical and biological processes in which oxygen is evolved or consumed. Finally, oxygen, hydrogen, and organic compounds injected into or otherwise transiently emerging in a gas stream can be analyzed, the first directly, the others after combustion in terms of residual oxygen.

Other modes of applying the present invention may be employed, change being made as regards the details described, provided the features stated in any of the following claims or the equivalent of such be employed.

I, therefore, particularly point out and distinctly claim as my invention:

1. In an apparatus capable of detecting and measuring small amounts of oxygen in a gas, the combination comprising a conductive cathode wire, the surface of which is selected from the group consisting of carbon, copper, gold, mercury, silver, and the elements of Group VIII of the Periodic Table having an atomic number of at least 44, a conductive anode wire, the surface of which is selected from the group consisting of carbon, gold, silver, stainless steel, tantalum, mercury, and the elements of Group VIII of the Periodic Table having an atomic number of at least 44, a non-conductive polymeric porous electrolyte-retentive substantially cylindrical diaphragm, an outer source of electrical current connected to said anode wire and said cathode wire having an electromotive force sufficient to cathodically reduce oxygen but insufficient to decompose water whereby hydrogen is evolved, and a current measuring device connected in series with said source of electrical current and said electrodes, wherein said anode wire and said cathode wire are helically wrapped around and on the cylindrical diaphragm and the turns of said anode wire are separate from and alternating with the turns of said cathode wire, and the said cathode wire is adapted to be partially exposed to the gas.

2. The apparatus according to claim 1 wherein said cathode wire and said anode wire are silver.

References Cited by the Examiner
UNITED STATES PATENTS

| | | | |
|---|---|---|---|
| 2,651,612 | 8/1953 | Haller | 204—195 |
| 2,805,191 | 9/1957 | Hersch | 204—195 |
| 2,830,945 | 4/1958 | Keidel | 204—195 |
| 2,865,832 | 12/1958 | Pitzer | 204—292 |
| 2,898,282 | 8/1959 | Flook et al. | 204—195 |
| 2,912,367 | 11/1959 | Asendorf et al. | 204—195 |
| 2,913,386 | 11/1959 | Clark | 204—195 |
| 2,930,747 | 3/1960 | Jankowski | 204—195 |
| 2,939,827 | 6/1960 | Jacobson et al. | 204—195 |
| 2,943,028 | 6/1960 | Thayer et al. | 204—195 |
| 2,943,036 | 6/1960 | Thayer et al. | 204—195 |
| 3,000,805 | 9/1961 | Carritt et al. | 204—195 |
| 3,038,848 | 6/1962 | Brewer et al. | 204—1 |
| 3,098,813 | 7/1963 | Beebe et al. | 204—195 |

JOHN H. MACK, *Primary Examiner.*

JOHN R. SPECK, *Examiner.*